United States Patent [19]
Wertz et al.

[11] Patent Number: 6,010,099
[45] Date of Patent: Jan. 4, 2000

[54] DIMPLE FORMING CLAMP USED TO HOLD SPRING JACKETED CABLE

[75] Inventors: Darrell Lynn Wertz, York; Randolph Lee Buchter, Harrisburg, both of Pa.

[73] Assignee: The Whitaker Corporation, Wilmington, Del.

[21] Appl. No.: 08/992,153

[22] Filed: Dec. 17, 1997

[51] Int. Cl.[7] ................ F16L 3/00; F16L 3/16; F16L 3/08
[52] U.S. Cl. ................ 248/55; 248/53; 248/65; 248/73; 248/74.3
[58] Field of Search ................ 248/53, 55, 65, 248/67.7, 73, 74.1, 74.2, 74.3, 300, 230.8, 230.9; 24/122.3, 131 C, 129 B, 115 G; 104/200; 174/136

[56] References Cited

U.S. PATENT DOCUMENTS

| | | | |
|---|---|---|---|
| 1,123,668 | 1/1915 | Blumenthal | 248/61 |
| 1,818,625 | 8/1931 | Hunter | 248/74.3 |
| 2,709,590 | 5/1955 | Whitney | 248/230.9 |
| 3,273,839 | 9/1966 | Bennett | 248/73 |
| 4,624,472 | 11/1986 | Stuart et al. | 280/420 |
| 5,297,890 | 3/1994 | Commins | 403/398 |
| 5,558,411 | 9/1996 | Kanjo et al. | 303/71 |
| 5,806,813 | 9/1998 | Binelli | 248/73 |

*Primary Examiner*—Derek J. Berger
*Assistant Examiner*—Michael D. Nornberg

[57] ABSTRACT

A clamp for an electrical cable which is particularly useful for fixing an electrical cable to a railway car truck. The clamp has an arched segment of a rigid sheet material which has a concave face, a convex face, opposed side flanks and open forward and rearward ends. The concave face and side flanks define an elongated concavity therebetween. An arcuate transition segment extends from each flank of the arched segment and connect to one of a pair of opposed flat wing segments. Each arcuate transition segment has at least one opening therethrough. Several detents project from the concave face into the concavity. A cincture such as a steel band extends through at least one opening in each arcuate transition segment and the opposite ends of the cincture are attached together. A helical spring having several windings is positioned in the concavity next to the concave face and extends from the forward end to the rearward end of the arched segment such that the detents project between the windings to prevent spring slippage. An electrical cable is mounted through the spring windings and extends from the forward end to the rearward end of the arched segment.

20 Claims, 4 Drawing Sheets

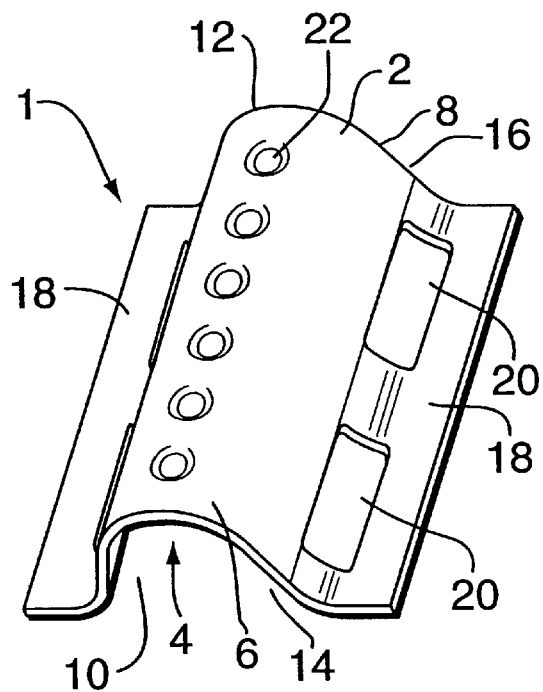
FIG. 1
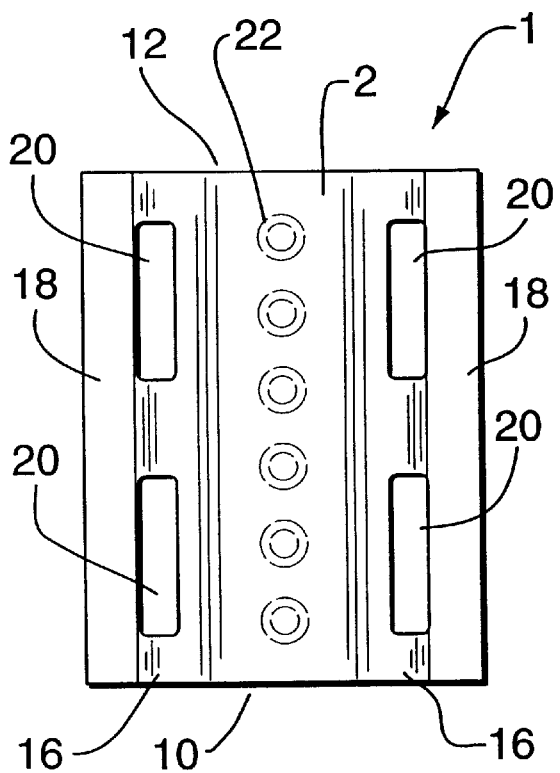
FIG. 2
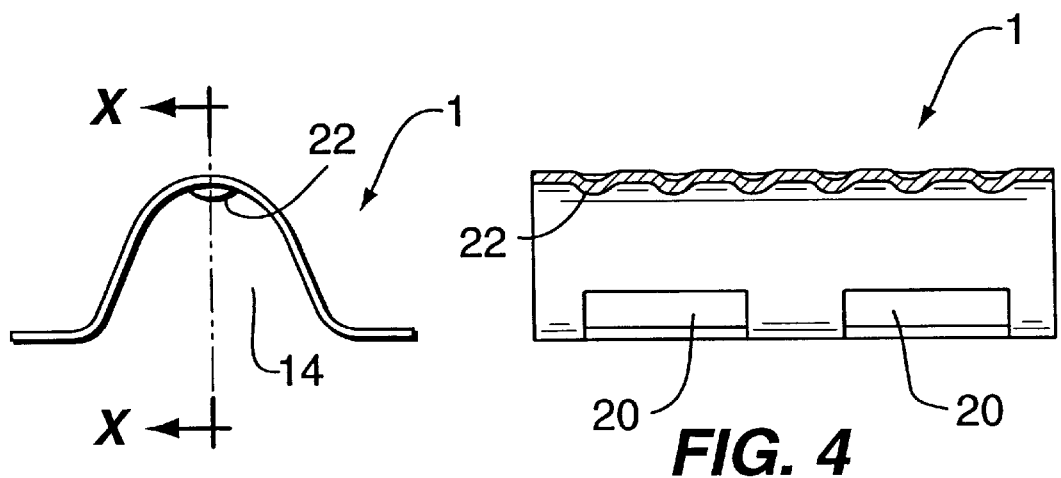
FIG. 3
FIG. 4

DIMPLE FORMING CLAMP USED TO HOLD SPRING JACKETED CABLE

BACKGROUND OF THE INVENTION

1. Field of the Invention

The present invention relates to a clamp for an electrical cable. More particularly, the invention pertains to a clamp for fixing an electrical cable to a railway car. Still more particularly, the invention relates to a clamp which is useful for mounting and protecting electrical cables which quickly apply railway car electronically controlled pneumatic (ECP) brakes.

2. Description of the Prior Art

It is known in the art that when a long train of moving railway cars is to be stopped, a control car typically transmits a pneumatic braking signal to brakes on the moving cars. A typical air brake may comprise an apparatus for pneumatically or mechanically applying brake shoes to the wheels of a railway car by pumping a handle connected by gears and/or linkages to the brake shoe engaging mechanism in contact with the wheels. The brakes can be applied or released from a remote or central control point such as the locomotive or caboose and may utilize vacuum, air pressure, or another source of power to activate or release a brake. Typical railway braking equipment is known from U.S. Pat. Nos. 4,624,472 and 5,558,411.

A problem with such a pneumatic braking system is that the braking signal from the control car does not quickly reach the brake shoe applying mechanism in the rear of long trains which have many dozens of railway cars. As a result, faster acting electrically actuated braking systems have been developed. These electrically actuated braking systems comprise a generator at the end of a railcar axle which supplies power to the car control unit and solenoid valves. The braking signal is issued to each car control unit from the main control car via a radio signal. It is a problem in the art to secure the cable to each railway car truck frame and protect it from its working environment A means therefore becomes necessary to secure an electrical cable between each generator and the main car control unit to a railway car truck frame. Typically the cable must be flexible, crush resistant, mechanically protected in a variety of environments, and must hold its shape and position. In addition, because of the strict operating and safety rules applicable to train operation in the United States and other countries, no holes may be drilled into the railway car trucks which might weaken the truck and interfere with train equipment and operation as required by practices established by the Association of American Railroads and by the relevant government agencies.

The present invention solves these problems by providing an improved clamp for such a railway car electrical cable. The clamp comprises a curved frame of rigid sheet material covering a helical spring which surrounds a cable. The spring serves to maintain cable flexibility and crush resistance. A series of detents project from the surface of the clamp into the spaces between the spring windings to prevent spring slippage within the clamp. One or more steel belts pass through holes in the clamp and around convenient parts of the railway car truck and are attached together. This arrangement firmly secure the clamp to the truck without having to drill holes in the truck.

SUMMARY OF THE INVENTION

The invention provides a clamp for an electrical cable comprising an arched segment of a substantially rigid sheet material having a concave face, a convex face, opposed side flanks and open forward and rearward ends; the concave face and side flanks defining an elongated concavity therebetween; a plurality of detents projecting from the concave face into the concavity; an arcuate transition segment extending from each flank of the arched segment and connecting to one of a pair of opposed flat wing segments; each arcuate transition segment having at least one opening therethrough.

The invention also provides an electrical connection comprising an electrical cable and a clamp for the electrical cable; the clamp comprising an arched segment of a substantially rigid sheet material having a concave face, a convex face, opposed side flanks and open forward and rearward ends; the concave face and side flanks defining an elongated concavity therebetween; a plurality of detents projecting from the concave face into the concavity; an arcuate transition segment extending from each flank of the arched segment and connecting to one of a pair of opposed flat wing segments; each arcuate transition segment having at least one opening therethrough; the electrical cable being mounted in the clamp and extending from the forward end to the rearward end of the arched segment.

The invention further provides a method of fixing an electrical cable to a rail car truck which comprises;

(a) positioning an electrical cable through a length of a helical spring having a plurality of windings to thereby form a helical spring covered electrical cable;

(b) providing a clamp comprising an arched segment of a substantially rigid sheet material having a concave face, a convex face, opposed side flanks and open forward and rearward ends; the concave face and side flanks defining an elongated concavity therebetween; a plurality of detents projecting from the concave face into the concavity; an arcuate transition segment extending from each flank of the arched segment and connecting to one of a pair of opposed flat wing segments; each arcuate transition segment having at least one opening therethrough;

(c) mounting the helical spring covered electrical cable in the concavity in juxtaposition with the concave face and extending from the forward end to the rearward end of the arched segment, such that a plurality of the detents project between the windings;

(d) extending a cincture through at least one opening in each arcuate transition segment and across the spring; and (e) attaching each of two ends of the cincture to a rail car truck.

The invention still further provides a method of fixing a helical spring covered electrical cable to a rail car truck which comprises (a) providing a helical spring covered electrical cable comprising an electrical cable extending through a length of a helical spring having a plurality of windings;

(b) providing a clamp comprising an arched segment of a substantially rigid sheet material having a concave face, a convex face, opposed side flanks and open forward and rearward ends; the concave face and side flanks defining an elongated concavity therebetween; a plurality of detents projecting from the concave face into the concavity; an arcuate transition segment extending from each flank of the arched segment and connecting to one of a pair of opposed flat wing segments; each arcuate transition segment having at least one opening therethrough;

(c) mounting the helical spring covered electrical cable in the concavity in juxtaposition with the concave face and extending from the forward end to the rearward end of the arched segment, such that a plurality of the detents project between the windings;

(d) extending a cincture through at least one opening in each arcuate transition segment and across the spring; and (e) attaching each of two ends of the cincture to a rail car truck.

BRIEF DESCRIPTION OF THE DRAWINGS

FIG. 1 shows a perspective view of a clamp according to the present invention.

FIG. 2 shows a top view of the clamp according to the invention.

FIG. 3 shows an end view of the clamp according to the invention.

FIG. 4 shows a side sectional view of the clamp according to the invention along line X—X of FIG. 5 shows a side elevational view of the clamp covering a helical spring.

DETAILED DESCRIPTION OF THE PREFERRED EMBODIMENT

Figure 5:
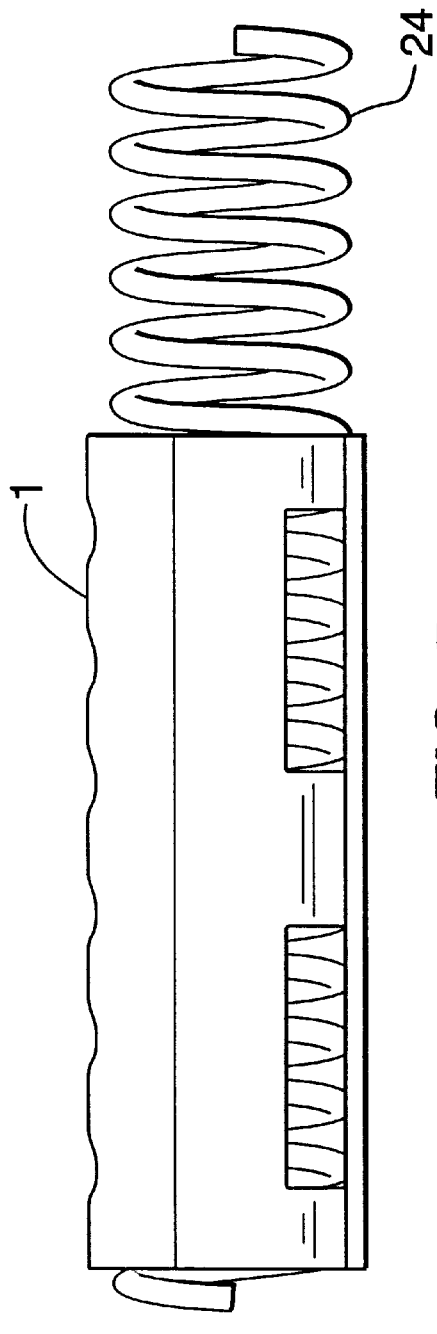

Referring to FIG. 1, there is shown a clamp 1 according to the invention. It comprises an arched segment 2 of a substantially rigid sheet material having a concave face 4, a convex face 6, opposed side flanks 8, an open forward end 10 and a rearward end 12. The concave face 4 and side flanks 8 define an elongated concavity 14. Extending from each flank 8 of the arched segment is an arcuate transition segment 16 connecting to one of a pair of opposed flat wing segments 18. Each arcuate transition segment 16 has at least one opening 20 therethrough. Projecting from the concave face 4 into the concavity 14 are several detents 22. The detents resemble dimples which can be formed by denting or punching through the top of the arched segment 2. Some of these features are seen more clearly in FIGS. 2–4. The segments of the clamp are preferably composed of a rigid sheet metal material such as steel, although other materials can also be used and as may be determined by those skilled in the art.

Figure 6:
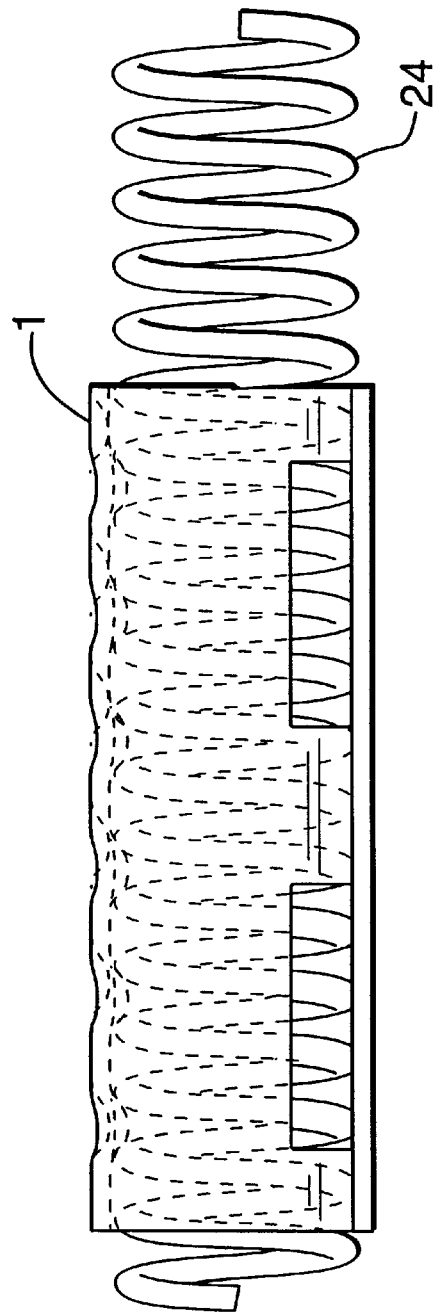
FIG. 6 shows a side elevational, partial phantom view of the clamp covering a helical spring.
Figure 7:
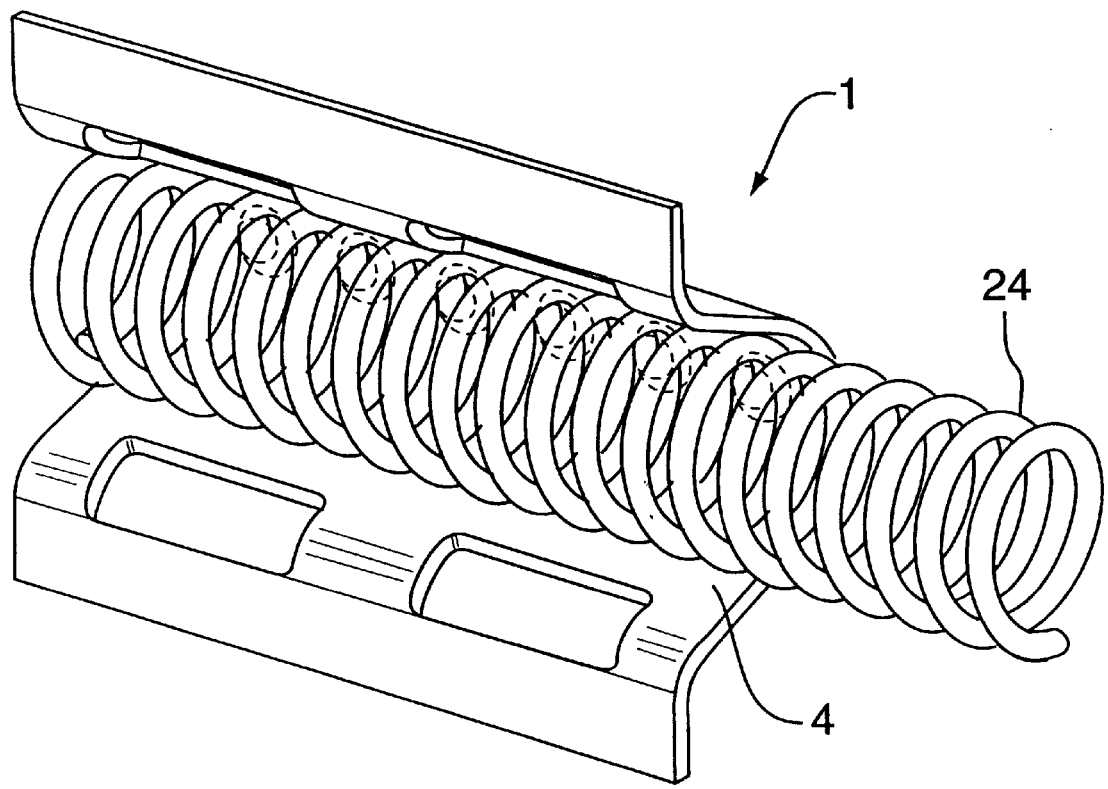
FIG. 7 shows an underside view of the clamp on a helical spring.

As shown in FIGS. 5–7, the clamp of claim 1 may further comprise a heavy helical spring 24. The spring comprises a plurality of windings positioned in the concavity adjacent to the concave face 4. It extends from the forward end 10 to the rearward end 12 of the arched segment. As seen in FIGS. 6 and 7, the detents project between the spring windings and prevent slippage of the spring along concave face 4. The helical spring is usually several feet long, such as from about 6 to about 10 feet long.

Figure 8:
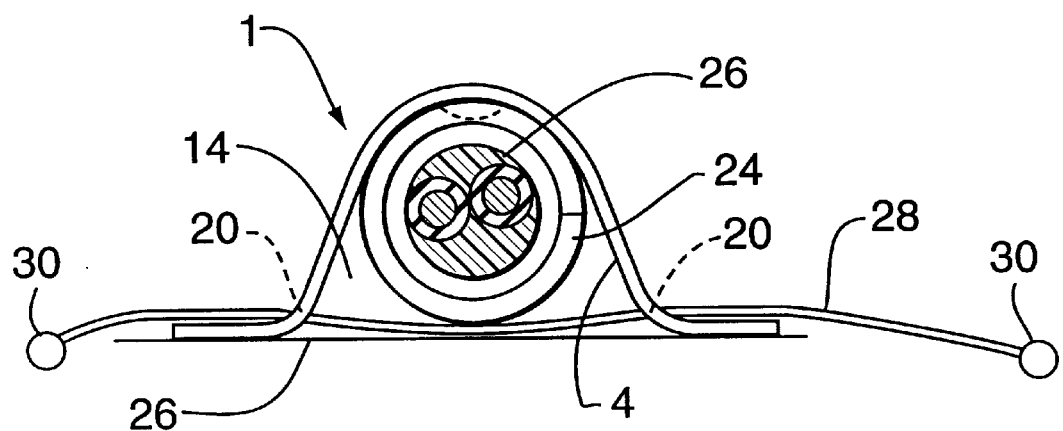
FIG. 8 shows an end view of a strapped clamp covering a helical spring and surrounding an electrical cable.
Figure 9:
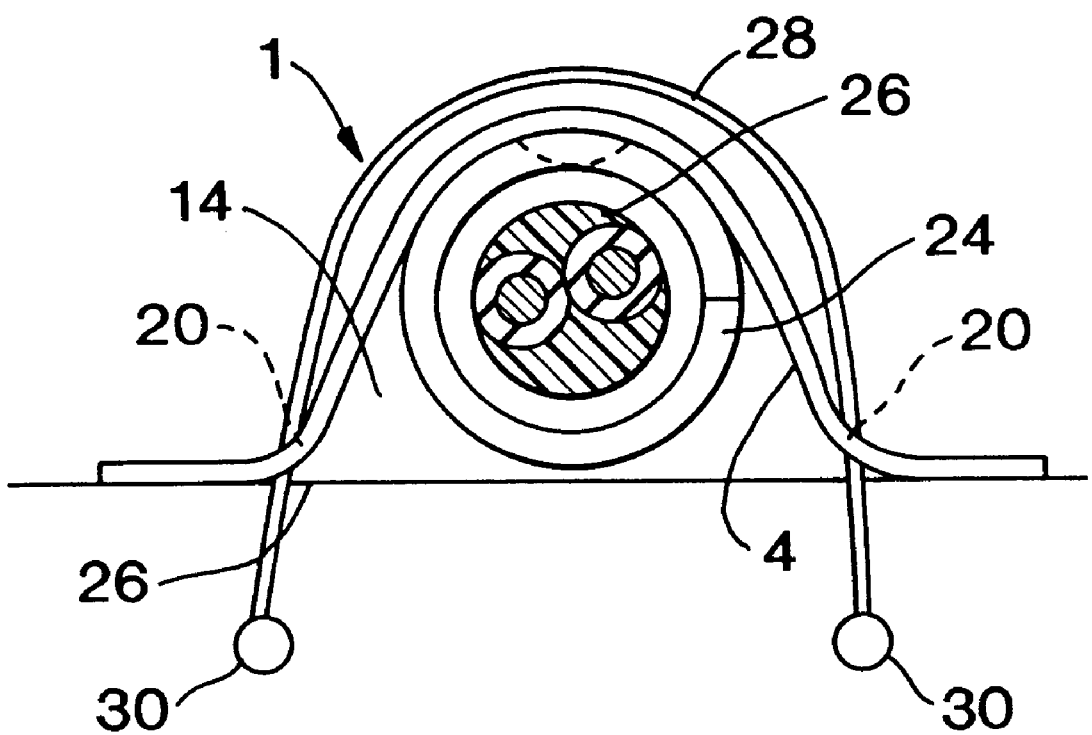
FIG. 9 shows another embodiment of the present invention.

As seen in FIG. 8, a multiwire cable 26, is wrapped by helical spring 24 and covered by clamp 1. The entire arrangement is attached to a railway car truck surface 26 and a cincture 28 is passed through opposite openings 20. The ends of the cincture are provided with suitable means 30 for attachment to each other. The cincture may comprise any suitable material and in the preferred embodiment it is a steel band. The cincture attachment means 30 may comprise a worm clasp such as a large hose clamp. As seen in FIG. 8, the cincture extends across the concavity. Alternatively it could be threaded through opening 20 across the convex face 6 (FIG. 9).

In use one may fix an electrical cable to a rail car truck by positioning an electrical cable through a length of the helical spring. The helical spring covered electrical cable is then mounted in the clamp against the concave face such that it extends from the forward end to the rearward end of the arched segment and the detents project between the spring windings. A cincture is then extended through opposite openings in the clamp and across the spring Thereafter each of two ends of the cincture is wound around a rail car truck and the cincture ends attached with sufficient tension thus pressing the spring tightly against the detents so that is does not slide.

What is claimed is:

1. A clamp for an electrical cable, comprising:
   an arched segment of a substantially rigid sheet material having a concave face, a convex face, opposed side flanks and open forward and rearward ends;
   an elongated cavity defined between said concave face and said side flanks;
   a plurality of detents projecting from said concave face into said concavity;
   an arcuate transition segment extending from each flank of the arched segment and connecting to one of a pair of opposed flat wing segments, wherein each arcuate transition segment defines at least one opening, said opening having a cincture extending therethrough, and means for attaching opposite ends of the cincture together.

2. A clamp for an electrical cable, comprising:
   an arched segment of a substantially rigid sheet material having a concave face, a convex face, opposed side flanks and open forward and rearward ends;
   an elongated cavity defined between said concave face and said side flanks;
   a plurality of detents projecting from said concave face into said concavity; and
   an arcuate transition segment extending from each flank of the arched segment and connecting to one of a pair of opposed flat wing segments, wherein each arcuate transition segment defines at least one opening, said opening having a cincture extending therethrough, wherein the cincture comprises a steel band.

3. The clamp of any one of claims 1 or 2 wherein the cincture extends across the concavity.

4. The clamp of claim 2 wherein the cincture comprises a steel band.

5. A clamp for an electrical cable, comprising:
   an arched segment of a substantially rigid sheet material having a concave face, a convex face, opposed side flanks and open forward and rearward ends;
   an elongated cavity defined between said concave face and said side flanks;
   a plurality of detents projecting from said concave face into said concavity; and
   an arcuate transition segment extending from each flank of the arched segment and connecting to one of a pair of opposed flat wing segments, wherein each arcuate transition segment defines at least one opening, said opening having a cincture extending therethrough, wherein the cincture extends across the convex face.

6. A clamp for an electrical cable, comprising:
- an arched segment of a substantially rigid sheet material having a concave face, a convex face, opposed side flanks and open forward and rearward ends;
- an elongated cavity defined between said concave face and said side flanks;
- a plurality of detents projecting from said concave face into said concavity;
- an arcuate transition segment extending from each flank of the arched segment and connecting to one of a pair of opposed flat wing segments, wherein each arcuate transition segment defines at least one opening; and
- a helical spring comprising a plurality of windings positioned in the concavity in juxtaposition with the concave face and extending from the forward end to the rearward end of the arched segment, wherein a plurality of the detents project between the windings.

7. The clamp of claim 6 further comprising a cincture extending through at least one opening in each arcuate transition segment wherein the cincture extends across the spring.

8. The clamp of any of claims 1 or 5–7 wherein the cincture comprises a steel band.

9. An electrical connection comprising an electrical cable and a clamp for the electrical cable; the clamp comprising an arched segment of a substantially rigid sheet material having a concave face, a convex face, opposed side flanks and open forward and rearward ends; the concave face and side flanks defining an elongated concavity therebetween; a plurality of detents projecting from the concave face into the concavity; an arcuate transition segment extending from each flank of the arched segment and connecting to one of a pair of opposed flat wing segments; each arcuate transition segment having at least one opening therethrough; the electrical cable being mounted in the clamp and extending from the forward end to the rearward end of the arched segment.

10. The electrical connection of claim 9 further comprising a cincture extending through at least one opening in each arcuate transition segment.

11. The electrical connection of claim 10 wherein the cincture comprises a steel band and further comprising means for attaching opposite ends of the cincture together.

12. The electrical connection of claim 10 wherein the cincture extends across the electrical cable.

13. The electrical connection of claim 10 wherein the cincture extends across the convex face.

14. The electrical connection of claim 9 further comprising a helical spring comprising a plurality of windings positioned in the concavity in juxtaposition with the concave face and extending from the forward end to the rearward end of the arched segment, and wherein a plurality of the detents project between windings; the electrical cable being mounted through the spring windings and extending from the forward end to the rearward end of the arched segment.

15. The electrical connection of claim 14 further comprising a cincture extending through at least one opening in each arcuate transition segment wherein the cincture extends across the spring.

16. The electrical connection of claim 15 wherein the cincture comprises a steel band and further comprising means for attaching opposite ends of the cincture together.

17. A method of fixing an electrical cable to a rail car truck which comprises
- (a) positioning an electrical cable through a length of a helical spring having a plurality of windings to thereby form a helical spring covered electrical cable;
- (b) providing a clamp comprising an arched segment of a substantially rigid sheet material having a concave face, a convex face, opposed side flanks and open forward and rearward ends; the concave face and side flanks defining an elongated concavity therebetween; a plurality of detents projecting from the concave face into the concavity; an arcuate transition segment extending from each flank of the arched segment and connecting to one of a pair of opposed flat wing segments; each arcuate transition segment having at least one opening therethrough;
- (c) mounting the helical spring covered electrical cable in the concavity in juxtaposition with the concave face and extending from the forward end to the rearward end of the arched segment, such that a plurality of the detents project between the windings;
- (d) extending a cincture through at least one opening in each arcuate transition segment and across the spring; and
- (e) attaching each of two ends of the cincture to a rail car truck.

18. The method of claim 17 wherein the cincture comprises a steel band further comprising means for attaching opposite ends of the cincture together.

19. A method of fixing a helical spring covered electrical cable to a rail car truck which comprises
- (a) providing a helical spring covered electrical cable comprising an electrical cable extending through a length of a helical spring having a plurality of windings;
- (b) providing a clamp comprising an arched segment of a substantially rigid sheet material having a concave face, a convex face, opposed side flanks and open forward and rearward ends; the concave face and side flanks defining an elongated concavity therebetween; a plurality of detents projecting from the concave face into the concavity; an arcuate transition segment extending from each flank of the arched segment and connecting to one of a pair of opposed flat wing segments; each arcuate transition segment having at least one opening therethrough;
- (c) mounting the helical spring covered electrical cable in the concavity in juxtaposition with the concave face and extending from the forward end to the rearward end of the arched segment, such that a plurality of the detents project between the windings;
- (d) extending a cincture through at least one opening in each arcuate transition segment and across the spring; and
- (e) attaching each of two ends of the cincture to a rail car truck.

20. The method of claim 19 wherein the cincture comprises a steel band further comprising means for attaching opposite ends of the cincture together.

* * * * *